Sept. 2, 1958 S. SWARTZ 2,849,831
SOAP AND FIGURED TOYS
Filed Aug. 9, 1955

INVENTOR
Sophia Swartz

United States Patent Office 2,849,831
Patented Sept. 2, 1958

2,849,831

SOAP AND FIGURED TOYS

Sophia Swartz, New York, N. Y.

Application August 9, 1955, Serial No. 527,391

1 Claim. (Cl. 45—28)

The present invention deals with a cake of soap and doll parts with head and feet protruding on each end so as to amuse a child and, from a practical angle, to stand up on its feet pedestal to keep the soap clean and dry and free of slime.

A further advantage of this invention is to use a floating cake of soap in conjunction with non floating core toys and parts assembled so as to make the combination float in water.

A further advantage is to use a non floating cake of soap in conjunction with floating core toys and parts to make the combination float in water.

A further advantage is that, the combination, the figured parts need not be a doll but may be some other form of creature, human, animal, bird, mammal or such objects as may be appealing to children such as a boat, fish, etc.

The present invention deals with a cake of soap and protruding head and feet in pedestal form, combined so as to give the appearance of one unit. The cake may be of a conventional cake, square or oval, or the soap may be moulded and shaped as a dress covering the torso part of a doll or suitable garb for bird, animal, fish, etc., which with the protruding head and feet makes a complete picture.

One simple way to bring about such a result is to have the body or cake pressed and while same is still in a moist condition the parts are partly pushed into the soap to form one unit. Or the soap may be first pressed with an indentation or a hole deep enough to screw paste in the parts, etc.

The present invention is not limited to a protruding head and feet pedestal to stand on. A child will be amused with a sudsing floating object in the tub which will encourage it to bathe, such as a fish, in which the head will appear at one end of the cake and the tail at the other end. The soap part may be a conventional cake of soap with these protruding parts added, the head at one end and the tail at the other. Or the soap may be pressed into a fish body with scales as decoration, and adding the separate parts as the head and the tail to complete the picture of the fish. The same may be accomplished with other toys and parts.

The parts to be combined with the soap may be of many materials. Plastic, wood, rubber, materials of either a cheaper or better grade, non-scratchable, or anything that will lend itself to produce such parts may be used.

When a transparent soap is used in which the entire torso is encased in the cake it tends to reveal the inside of the toy.

Figure 1:
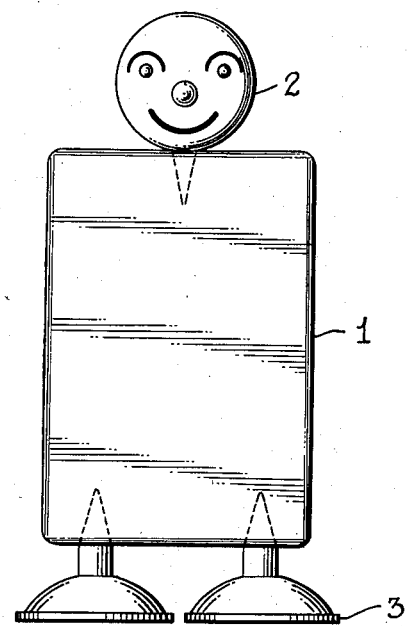
Fig. 1 is a view of the soap and figured toy.

The embodiment shown in Fig. 1, includes a cake of soap 1, a buoyant element in the form of a protruding head 2, and a second buoyant element in the form of protruding feet 3.

Figure 2:
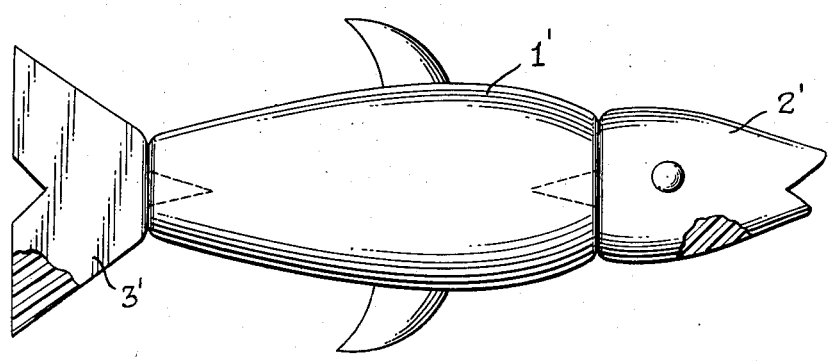
Fig. 2 is a modification of Fig. 1.

The embodiment shown in Fig. 2 includes a cake of soap 1', a protruding head 2', and protruding tail 3'.

I claim:

A combination of a cake of soap having opposed ends and a pair of buoyant elements each having a projecting portion adapted to be secured in said ends, one of said elements having a planar portion opposite the first said portion constructed to support the cake of soap in an upright position with the other element atop said bar, thus providing for keeping the cake of soap clean and dry when not in use while assuring a floating of the cake of soap when it is in water.

References Cited in the file of this patent

UNITED STATES PATENTS

| D. 113,329 | Lewis | Feb. 14, 1939 |
| D. 157,001 | Reinecke | Jan. 24, 1950 |
| D. 164,274 | Baden | Aug. 21, 1951 |
| 513,146 | Richberg | Jan. 23, 1894 |
| 740,469 | Roake | Oct. 6, 1903 |
| 857,570 | Allen | June 25, 1907 |
| 1,997,474 | Stone | Apr. 9, 1935 |
| 2,597,925 | Edger | May 27, 1952 |
| 2,677,913 | Swartz | May 11, 1954 |

FOREIGN PATENTS

| 459,209 | Italy | Sept. 1, 1950 |
| 750,107 | France | May 22, 1933 |
| 974,040 | France | Sept. 20, 1950 |